US008603681B2

(12) United States Patent
Hildebrandt et al.

(10) Patent No.: US 8,603,681 B2
(45) Date of Patent: Dec. 10, 2013

(54) POROUS FILM MATERIAL COMPRISING AT LEAST ONE CARBONACEOUS SEMIMETAL OXIDE PHASE, AND USE THEREOF AS A SEPARATOR MATERIAL FOR ELECTROCHEMICAL CELLS

(75) Inventors: Nicole Hildebrandt, Bermersheim (DE);
Arno Lange, Bad Dürkheim (DE);
Klaus Leitner, Ludwigshafen (DE);
Phillip Hanefeld, Cranford, NJ (US);
Claudia Staudt, Düsseldorf (DE)

(73) Assignee: BASF SE, Ludwigshafen (DE)

( * ) Notice: Subject to any disclaimer, the term of this patent is extended or adjusted under 35 U.S.C. 154(b) by 835 days.

(21) Appl. No.: 12/824,656

(22) Filed: Jun. 28, 2010

(65) Prior Publication Data

US 2011/0003189 A1 Jan. 6, 2011

(30) Foreign Application Priority Data

Jul. 1, 2009 (EP) .................................... 09164339

(51) Int. Cl.
*H01M 2/16* (2006.01)
*B23B 3/26* (2006.01)
*C08J 9/26* (2006.01)
*C08G 77/00* (2006.01)
*C08F 6/00* (2006.01)

(52) U.S. Cl.
USPC .......... 429/249; 428/220; 428/315.7; 521/62; 521/134; 521/136; 521/153; 521/154; 528/9; 528/40; 528/481; 528/491; 528/493; 977/785

(58) Field of Classification Search
USPC ............. 429/249; 977/785; 521/62, 134, 136, 521/153, 154; 528/9, 40, 481, 491, 493; 428/220, 315.5, 315.7
See application file for complete search history.

(56) References Cited

U.S. PATENT DOCUMENTS 8,054,611 B2 * 11/2011 Mizuno .......................... 361/529
2011/0143220 A1 6/2011 Steimle et al.

FOREIGN PATENT DOCUMENTS

| CA | 2710700 A1 * | 7/2009 |
|---|---|---|
| WO | WO 03/072231 A2 | 9/2003 |
| WO | WO 03/073534 A2 | 9/2003 |
| WO | WO 2004/021476 A1 | 3/2004 |
| WO | WO 2004/021477 A1 | 3/2004 |
| WO | WO 2004/021499 A2 | 3/2004 |
| WO | WO 2004/049472 A2 | 6/2004 |
| WO | WO 2005/038959 A1 | 4/2005 |
| WO | WO 2007/028662 A1 | 3/2007 |
| WO | WO 2009/083083 A1 | 7/2009 |

OTHER PUBLICATIONS

U.S. Appl. No. 13/116,360, filed May 26, 2011, Janssen.
U.S. Appl. No. 13/168,273, filed Jun. 24, 2011, Leitner, et al.
Sheng Shui Zhang, "A Review on the Separators of Liquid electrolyte Li-ion Batteries", Journal of Power Sources, vol. 164, 2007, pp. 351-364.
W. J. Work et al., "Definitions of Terms Related to Polymer Blends, Composites, and Multiphase Polymeric Materials", Pure and Applied Chemistry, vol. 76, No. 11, 2004, pp. 1985-2007.
Silke Grund et al., "Nanocomposites Prepared by Twin Polymerization of a Single-Source Monomer", Angewandte Chemie nternational Edition, vol. 46, Issue 4, 2007, pp. 628-632.
U.S. Appl. No. 13/437,291, filed Apr. 2, 2012, Leitner, et al.

\* cited by examiner

*Primary Examiner* — Fred M Teskin
(74) *Attorney, Agent, or Firm* — Oblon, Spivak, McClelland, Maier & Neustadt, L.L.P.

(57) ABSTRACT

The present invention relates to a novel porous film material which comprises at least one carbonaceous semimetal oxide phase, and to a process for production thereof. The invention also relates to the use of these porous film materials as a separator layer or for production of such separator layers in electrochemical cells, particularly in lithium cells and especially in lithium secondary cells.
The inventive porous film material comprises:
a) at least one carbonaceous (semi)metal oxide phase A of silicon, of aluminum, of titanium or of zirconium, which has hydrocarbon groups bonded covalently to the (semi)metal of said (semi)metal oxide phase A;
b) optionally one or more organic polymer phases B,
said carbonaceous (semi)metal oxide phase A forming essentially continuous phase domains in which the pore phase present in the film material and the optionally present organic polymer phase(s) B are intercalated, the mean distance between two phase boundaries of adjacent domains of identical phases being not more than 50 nm, preferably not more than 10 nm, particularly not more than 5 nm and especially not more than 2 nm.

25 Claims, No Drawings

POROUS FILM MATERIAL COMPRISING AT LEAST ONE CARBONACEOUS SEMIMETAL OXIDE PHASE, AND USE THEREOF AS A SEPARATOR MATERIAL FOR ELECTROCHEMICAL CELLS

The present invention relates to a novel porous film material which comprises at least one carbonaceous semimetal oxide phase, and to a process for production thereof. The invention also relates to the use of these porous film materials as a separator layer or for production of such separator layers in electrochemical cells, particularly in lithium cells, e.g. lithium ion cells or lithium sulfur cells, and especially in lithium ion secondary cells or lithium sulfur secondary cells.

In addition to the electrodes, separators are an essential constituent in electrochemical cells. The separator is arranged between the positive and negative electrodes of the electrochemical cell and serves firstly to prevent physical contact between the electrodes, and secondly to ensure free ion flow and hence charge transfer between the electrodes. Even though the separator is not involved in the chemical reactions which proceed in the electrochemical cell, its structure and its properties have a great influence on performance and lifetime of the battery, especially on the energy and current densities achievable in the batteries, and the cycle stability and reliability thereof.

In general, separators are thin porous layers which are formed from electrically insulating substances which have a high mechanical strength and possess a high long-term stability with respect to the chemicals used in the system, for example in the electrolyte of the electrochemical cell. Suitable separators must additionally be permanently elastic and have a high strength in order to be able to tolerate, without being destroyed, the changes in dimensions of the electrode materials which occur in the course of charging and discharging, and thus to ensure that they are able to function over a multitude of charging and discharging cycles. At the same time, the thermal stability of the separator material should be high in order to reliably prevent a short circuit even in the event of thermal or mechanical stress on the cell. In addition, the separator material should remain dimensionally stable in the course of heating and especially not shrink in order to ensure a long lifetime of the cell.

Even though separators, by their nature, constitute an electrical resistance, they must have a good permeability for the electrolyte, in order to ensure sufficient charge flow. The ratio of specific resistivity of the separator filled with the electrolyte to the specific resistivity of the electrolyte without separator (known as the MacMullin number) should therefore not be too great. In addition, permeability of the separator material should be homogeneous in order to ensure a high cycle stability and a long lifetime of the cell. In this context, the wettability of the separator material by the polar electrolyte also plays an important role. For instance, a low wettability can lead to the effect that the separator cannot be filled homogeneously with the electrolyte, and areas not filled by the electrolyte (so-called dead areas) form in the separator, which thus lead to areas with increased electrical resistance.

A further aspect is of course the production costs, since the separator material can make up more than 20% of the manufacturing costs of the cells.

An overview of the currently known separator materials and of the requirements made on them can be found, for example, in S. S. Zhang et al., J. Power Sources, 164 (2007), 351-364. The separator materials used at present can be divided roughly into three different classes:

(1) Microporous polymer membranes: These are generally formed from polyethylene (PE), including HDPE and UHM-WPE, polypropylene (PP) or polyethylene-polypropylene blends, and are comparatively inexpensive to produce. Disadvantages are the low thermal stability of the materials, their comparatively high shrinkage in the course of heating, and their only moderate wettability by polar electrolytes.

(2) Nonwovens: These are generally formed from organic or inorganic fiber materials bound thermoplastically or by means of suitable adhesive resins. Owing to their open structure, however, they are not very suitable as separators in lithium ion cells, since they can prevent a short circuit between the electrodes only in the case of relatively large separator thicknesses, which of course is at the expense of the specific capacitance of the cell and causes an increase in the internal resistance. In lithium ion cells, such separators are used as supports for gel polymer electrolytes, which greatly restricts the use thereof and complicates the production of the cells. They are unsuitable for liquid electrolytes for the reasons mentioned above.

(3) Ceramic materials and ceramic composites: These include firstly purely inorganic materials such as inorganic nonwovens, for example glass or ceramic nonwovens, and ceramic papers. These generally have only a low mechanical stability. Better properties are possessed by composite materials which consist of inorganic particles bound with an inorganic or polymeric binder. Even though these materials feature good wettability by polar electrolytes owing to the hydrophilicity of the inorganic constituents, their mechanical stability frequently leaves something to be desired. In addition, such materials in many cases can only be applied as a coating directly to the electrode material, which complicates the use thereof in the production of the cells.

Recently, there have been various reports about inorganic separators composed of composite materials in which porous inorganic particles are bound to a polymeric nonwoven by means of an inorganic binder (see, for example, WO 2003/072231, WO 2003/073534, WO 2004/021476, WO 2004/021477, WO 2004/021499, WO 2004/049472). In addition to good wettability for hydrophilic electrolytes, these separators have a good mechanical stability in fiber direction of the nonwoven material. However, the adhesion of the particles on the polymeric nonwoven is comparatively poor and leads to faults in production. Moreover, the separators are comparatively stiff, which complicates the processing thereof.

WO 2005/038959 describes a separator material in which the adhesion of the inorganic particles on the polymeric nonwoven is said to be improved by use of two different adhesion promoters based on alkyltrialkoxysilanes, the alkyl groups of which have functional groups which react with one another to form a bond. However, the elasticity of such materials is unsatisfactory. Moreover, the production requires catalysts such as nitric acid, which are corrosive.

WO 2007/028662 again proposes improving the service life of separator materials based on polymeric nonwovens coated with inorganic particles by using a mixture of inorganic and organic particles to coat the nonwoven material. This of course worsens the wettability and the specific resistance of the separator. In addition, the flexibility of the separators and the adhesion of the particles on the nonwoven still leaves something to be desired.

It is therefore an object of the present invention to provide a separator material which is suitable for use in electrochemical cells, especially in those which comprise a liquid, preferably organic electrolyte. The separator material should be suitable particularly for lithium cells or lithium batteries, such as lithium ion batteries or lithium ion cells and lithium sulfur batteries or Li—S cells and especially for lithium ion secondary batteries Li—S secondary batteries, and should not have at least one of the disadvantages of the prior art. The separator material should additionally be producible inexpensively by a simple process. More particularly, the separator material should have one or more of the following properties:

a high chemical stability with respect to the constituents present in the cell;

a high thermal stability, especially at temperatures above 180° C.;

a high mechanical stability, a good flexibility and permanent elasticity, a high dimensional stability, i.e. a low shrinkage at relatively high temperatures, a good wettability for liquid organic electrolytes, a high permeability or a low intrinsic resistance, characterized by low MacMullin numbers.

These and further objects are achieved by the inventive porous film material described hereinafter.

Accordingly, the present invention relates to a porous film material comprising:

a) at least one carbonaceous (semi)metal oxide phase A of silicon, of aluminum, of titanium or of zirconium, which has hydrocarbon groups bonded covalently to the (semi) metal of said (semi)metal oxide phase A;

b) optionally one or more organic polymer phases B, said carbonaceous (semi)metal oxide phase A forming essentially continuous phase domains in which the pore phase present in the film material and the optionally present organic polymer phase(s) B are intercalated, the mean distance between two phase boundaries of adjacent domains of identical phases being not more than 50 nm, preferably not more than 10 nm, particularly not more than 5 nm and especially not more than 2 nm.

Owing to its composition and the specific morphology of the carbonaceous (semi)metal oxide phase (continuous domain structure with small dimensions between adjacent phase boundaries and accordingly very fine pores), the inventive material is particularly suitable as a separator material in electrochemical cells, particularly for lithium ion cells, especially for lithium ion secondary cells and batteries. More particularly, it features a high wettability for organic and especially for liquid organic electrolytes, and has good chemical and thermal stabilities. This ensures a good cycle stability and increased reliability of the cells. Moreover, the inventive film material, probably owing to the specific phase morphology, has a high mechanical stability and features low or zero thermal shrinkage. Moreover, it can be produced in a simple manner and with reproducible quality.

The invention therefore also provides for the use of the inventive film material for producing separators or separator layers for electrochemical cells, especially for those electrochemical cells which comprise a liquid and especially a liquid organic electrolyte. The invention especially also provides for the use of the inventive film material for producing separators or separator layers for lithium ion cells or lithium ion batteries, especially for lithium ion secondary cells or lithium ion secondary batteries. The invention especially also provides for the use of the inventive film material for producing separators or separator layers for lithium sulfur cells or lithium sulfur batteries, especially for lithium sulfur secondary cells or lithium sulfur secondary batteries. The invention provides an electrochemical cell which preferably comprises an organic electrolyte, particularly a liquid organic electrolyte, and particularly a lithium ion cell or lithium ion battery, and a lithium sulfur cells or lithium sulfur battery, especially a lithium ion secondary cell or lithium ion secondary battery and a lithium sulfur secondary cell or lithium sulfur secondary battery, which has at least one separator layer arranged between the electrodes, said separator layer being formed by or consisting of an inventive film material.

Owing to their particular morphology, especially owing to the nanoporous structure, the inventive porous film materials are suitable for the production of so-called lithium-sulfur cells, i.e. electrochemical cells whose cathode material comprises a lithium sulfide. The lithium-sulfur cell enables higher energy densities than conventional lithium ion cells. However, a problem which occurs in the course of discharge of the cell is the formation of polysulfides, for example $Li_2S_4$ or $Li_2S_6$, which are soluble in the liquid organic electrolytes used for this purpose. In the case of use of conventional separators with comparatively large pores, there is therefore the risk that the polysulfide ions migrate to the anode, which leads to an energy loss in the cell. The inventive porous film materials are impermeable to polysulfide ions owing to their nanoporous structure and therefore increase the stability of such cells. Accordingly, a particular embodiment of the invention relates to the use of the inventive porous film materials for producing separators for lithium-sulfur cells, and lithium-sulfur cells which have an inventive separator material arranged between the anode and the cathode.

The inventive porous film materials can be produced in a particularly simple manner by a twin copolymerization process, as explained in detail hereinafter, followed by an at least partial removal of organic polymer phase from the film composite materials formed in the twin polymerization. The invention therefore also provides a process for producing the inventive porous film materials, comprising the twin copolymerization of suitable monomers M1 and M2 to form a film composite material which comprises at least one carbonaceous (semi)metal oxide phase A and at least one organic polymer phase B, followed by an at least partial removal of organic polymer phase from the film composite material.

In the inventive materials, the carbonaceous (semi)metal oxide phase is present essentially as a continuous phase in which the pores or the pore phase and the optionally present organic polymer phases B are intercalated, or which surrounds the pores. The pore phase and the optionally present organic polymer phases B may in turn form discontinuous domains or preferably continuous domains, in which latter case they form co-continuous phase domains with the carbonaceous (semi)metal oxide phase A. The areas in which the carbonaceous (semi)metal oxide phase A is present essentially as a continuous phase make up generally at least 80% by volume, especially 90% by volume, of the inventive film material.

Preferably, in the inventive film materials, the (semi)metal oxide phase A on the one hand, and the pore phase and the optionally present polymer phase B on the other hand, are present in a co-continuous arrangement over wide areas, i.e. the (semi)metal oxide phase A and the pore phase, or the pore phase together with the polymer phase B, form predominantly, i.e. over wide areas, no isolated phase domains surrounded by an optionally continuous phase domain. Instead, (semi)metal oxide phase A on the one hand, and the pore phase or the pore phase together with the polymer phase B on the other hand, form spatially separate continuous phase domains which penetrate one another, as is evident by studying the materials by means of transmission electron microscopy (TEM), especially by means of HAADF-STEM (HAADF-STEM: high angle annular darkfield scanning electron microscopy).

With regard to the terms "continuous phase or phase domains", "discontinuous phase or phase domains" and "co-continuous phase or phase domains", reference is also made to W. J. Work et al. Definitions of Terms Related to Polymer Blends, Composites and Multiphase Polymeric Materials, (IUPAC Recommendations 2004), Pure Appl. Chem., 76 (2004), p. 1985-2007, especially p. 2003. According to this, the term "continuous" in relation to a phase means that within one of the domains of the particular phase a continuous path to all phase domain boundaries may be drawn without crossing a phase domain boundary. According to this, a co-continuous arrangement of a system consisting of two or more phases is understood to mean a phase-separated arrangement of the phases, in which within one domain of the particular phase a continuous path through either phase domain may be drawn to all phase domain boundaries without crossing any phase domain boundary. Accordingly, the phases in a co-continuous arrangement penetrate one another.

In the inventive film materials, the distances between the domains of adjacent identical phases are small and are on average not more than 50 nm, frequently not more than 10 nm, particularly not more than 5 nm and especially not more than 2 nm. The distance between adjacent identical phases is, for example, the distance between two domains of the carbonaceous (semi)metal oxide phase A which are separated from one another by a pore phase or an organic polymer phase B, or the distance between two domains of the pore phase or of the polymer phase B which are separated from one another by a domain of the (semi)metal oxide phase A. The mean distance between the domains of adjacent identical phases as well as the mean spatial extent of a phase can be determined by means of small-angle X-ray scattering (SAXS) via the scatter vector q (measurement in transmission at 20° C., monochromatized $CuK_\alpha$ radiation, 2D detector (image plate), slit collimation.

In the inventive film materials, the (mean) distance between the domains of adjacent identical phases of course corresponds to the (mean) spatial extent of the phases between the phase boundaries surrounding them, at right angles to the phase interface. In the case of a continuous phase, the extent of the phase is therefore understood to mean the mean diameter which is found in a section through the phase in the direction of the surface normal of the phase interface. The mean extent of the phase A, and also of the pore phase or of the polymer phase B, will therefore generally on average be not more than 50 nm, frequently not more than 10 nm, particularly not more than 5 nm and especially not more than 2 nm.

The (mean) extent of the phase areas and hence the (mean) distances between adjacent phase boundaries and the arrangement of the phase can also be determined by transmission electron microscopy, especially by means of the HAADF-STEM technique. This imaging technique shows comparatively heavy elements (for example (semi)metal atoms compared to C, O or N) in a lighter color than lighter elements. Preparation artifacts can likewise be recognized, since denser areas of the preparations likewise appear in a lighter color than less dense areas.

According to the invention, the film material comprises a carbonaceous (semi)metal oxide phase A. In this phase, the carbon is present essentially in the form of hydrocarbon groups which are bonded to the metal atom or the semimetal atom via a covalent bond. The proportion of atoms other than the (semi)metal M, hydrogen and oxygen elements present in the phase A, for example N, S or P or (semi)metals different from Si, Ti, Al or Zr, is generally less than 10% by weight, especially less than 5% by weight, based on the total amount of the phase. The content of the different atoms in the phase can, optionally after complete removal of the polymer phase B, be determined by elemental analysis or by means of X-ray photoelectron spectroscopy.

The (semi)metal oxide phase preferably comprises, as the (semi)metal, predominantly, i.e. to an extent of at least 50 mol %, particularly to an extent of at least 80 mol % and especially to an extent of at least 90 mol %, based on the total amount of the (semi)metal atoms in the phase A, silicon. More particularly, silicon is the sole metal or semimetal in the phase A. In these cases, the (semi)metal oxide phase is a silicon dioxide or a polysiloxane in which at least a portion of the silicon atoms bear hydrocarbon radicals, and a portion of the silicon atoms, generally not more than 50 mol %, particularly not more than 20 mol % and especially not more than 10 mol %, may be replaced by other (semi)metal atoms such as Al, Ti or Zr.

According to the invention, the (semi)metal oxide phase A comprises hydrocarbon groups which are bonded covalently, i.e. via a carbon atom, to the (semi)metal. In general, 10 to 95 mol %, frequently 20 to 90 mol %, particularly 30 to 85 mol % and especially 40 to 80 mol % of the (semi)metal atoms present in the (semi)metal oxide phase bear at least one hydrocarbon group. In general, the hydrocarbon groups make up at least 10% by weight and up to 90% by weight, preferably 20 to 80% by weight and especially 25 to 70% by weight, based on the total amount of the carbonaceous (semi)metal oxide phase. Accordingly, the total amount of (semi)metal plus oxygen makes up generally 10 to 90% by weight, particularly 20 to 80% by weight and especially 30 to 75% by weight, based on the total amount of the carbonaceous (semi) metal oxide phase.

The proportion of the hydrocarbon groups bonded to the (semi)metal, based on the total amount of the organic constituents present in the porous film material, can be determined in a manner known per se by determining the total amount of organic constituents in the porous film material (for example by elemental analysis), completely removing the polymer phase B and again determining the content of organic constituents. It is likewise possible to determine this content by solid-state $^1$H NMR or $^{13}$C NMR. In an analogous manner, it is possible to determine the content of the hydrocarbon groups bonded to the (semi)metal, based on the total amount of the film material or based on the total amount of the carbonaceous (semi)metal oxide phase A.

Examples of such hydrocarbon groups are alkyl groups having preferably 1 to 100 carbon atoms, cycloalkyl groups having preferably 3 to 10 and especially 5 or 6 carbon ring atoms, and aryl groups, especially phenyl groups, where the cycloalkyl and aryl groups are unsubstituted and/or may bear 1, 2, 3, 4, 5 or 6 alkyl groups each having 1, 2, 3 or 4 carbon atoms. Preferably, at least 50 mol %, especially at least 70 mol %, of the hydrocarbon groups present in the carbonaceous (semi)metal oxide phase A are $C_1$-$C_6$-alkyl groups, especially methyl groups. The remaining groups are preferably selected from $C_7$-$C_{100}$-alkyl groups, cycloalkyl groups having preferably 3 to 10 and especially 5 or 6 carbon ring atoms, and aryl groups, especially phenyl groups, where cycloalkyl and phenyl may be substituted in the manner described above. In a particularly preferred embodiment of the invention, at least 95 mol % and especially all of the hydrocarbon groups present in the carbonaceous (semi)metal oxide phase A are $C_1$-$C_6$-alkyl groups, especially methyl groups. In another, likewise preferred embodiment of the invention, 50 to <95 mol %, especially 60 to 90 mol %, of the hydrocarbon groups present in the (semi)metal oxide phase A are $C_1$-$C_6$-alkyl groups, especially methyl groups, and 5 to 50 mol %, especially 10 to 40 mol %, of the hydrocarbon groups present in the carbonaceous (semi)metal oxide phase A are selected from $C_7$-$C_{100}$-alkyl groups, cycloalkyl groups having preferably 3 to 10 carbon ring atoms, and aryl groups, especially phenyl groups, where cycloalkyl and phenyl may be substituted in the manner described above.

The term "alkyl" as used here comprises saturated linear or branched hydrocarbon radicals having generally 1 to 100 carbon atoms. Alkyl comprises short-chain alkyl groups having generally 1 to 6 and especially 1 to 4 carbon atoms, such as methyl, ethyl, n-propyl, isopropyl, n-butyl, isobutyl, 2-butyl, tert-butyl, n-pentyl and isomers thereof, and n-hexyl and branched hexyl groups, and longer-chain alkyl groups having 7 or more carbon atoms, such as heptyl, octyl, nonyl, decyl, undecyl, dodecyl, tridecyl, tetradecyl, pentadecyl, hexadecyl, heptadecyl, octadecyl, nonadecyl, eicosanyl etc., where the aforementioned radicals may be linear or branched, and radicals derived from oligomers or polymers of the $C_2$-$C_6$-olefins, e.g. oligo- and poly-1-propenes having 3 to 33 propene units, and oligomers and polymers of 1-butene, of 2-butene and/or of isobutene having 2 to 25 butene units.

The term "cycloalkyl" as used here comprises 3- to 10-membered and especially 5- or 6-membered saturated carbocyclic radicals such as cyclopropyl, cyclobutyl, cyclopentyl, cyclohexyl, cycloheptyl, cyclooctyl, norbornyl or decalinyl, which are unsubstituted or may be substituted in the manner described above.

The term "aryl" as used here comprises aromatic carbocycles such as phenyl or naphthyl, which are unsubstituted or may be substituted in the manner described above.

In addition to the phase A, the inventive film material may also have one or more polymer phases B. These are generally present as a result of the preparation and modify the properties of the film material. This polymer phase B/these polymer phases B will generally not exceed 50% by weight, frequently 40% by weight, preferably 30% by weight and especially 20% by weight, based on the total weight of the film material. Accordingly, the carbonaceous (semi)metal oxide phase A makes up generally at least 50% by weight, frequently at least 60% by weight, preferably at least 70% by weight and especially at least 80% by weight of the film material. In a preferred embodiment of the invention, the proportion of the polymer phase B is 5 to 50% by weight, especially 10 to 40% by weight or 20 to 40% by weight, and the proportion of the (semi)metal oxide phase A is 50 to 95% by weight, especially 60 to 90% by weight or 60 to 80% by weight, based on the total weight of the film material. In another embodiment of the invention, the film material comprises essentially no polymer phase B or less than 20% by weight, particularly less than 10% by weight and especially less than 5% by weight, based on the total weight of the film material. Correspondingly, phase A then makes up more than 80% by weight, particularly more than 90% by weight and especially more than 95% by weight, based on the total weight of the film material. The total amount of organic constituents, i.e. the hydrocarbon groups bonded to the (semi)metal and the optionally present polymer phase B, based on the film material, is generally in the range from 10 to 90% by weight, frequently in the range from 25 to 85% by weight and especially in the range from 30 to 75% by weight. Correspondingly, the total amount of the inorganic constituents ((semi)metal+(oxidic) oxygen bound thereto) is 10 to 90% by weight, frequently 15 to 75% by weight and especially 25 to 70% by weight.

The type of the optionally present organic polymer phase(s) B is of minor importance for the inventive materials. In general, said organic polymer phase(s) B comprise polymers obtainable by a cationic polymerization. In one embodiment of the invention, polymer phase B comprises an aryl-aldehyde resin, i.e. a condensation product of an aromatic compound with an aldehyde, such as especially formaldehyde, especially a phenol-formaldehyde resin. In this context, the term "phenol" also comprises substituted phenols such as cresols.

In addition to the carbonaceous (semi)metal oxide phase A and the optionally present organic polymer phase(s) B, the inventive film materials have pores which are intercalated in the carbonaceous (semi)metal oxide phase A and which generally form a co-continuous arrangement with the carbonaceous (semi)metal oxide phase A. In general, the pores will make up at least 30% by volume, frequently at least 40% by volume, e.g. 30 to 90% by volume, especially 40 to 80% by volume, based on the total volume of the film material.

The inventive film materials are additionally notable in that at least some of the pores are so-called nanopores. Accordingly, the inventive materials or the structure or morphology thereof are also referred to as nanoporous. Preference is given to inventive film materials in which at least 50% by volume, especially at least 60% by volume, of the pores, based on the total pore volume in the film material, are nanopores. Nanopores are understood to mean pores which have a pore diameter of at most 50 nm, e.g. a pore diameter in the range from 0.1 to 50 nm, particularly 0.2 to 20 nm and especially 0.5 to 10 nm. The pore sizes can be determined in a manner known per se, for example transmission electron microscopy (TEM) or small-angle X-ray scattering (SAXS).

The inventive film materials are notable in that they possess a high specific surface area. The specific surface area, measured as the so-called BET surface area at $-196°$ C. to DIN 66131, will generally be at least 100 $m^2/g$, frequently at least 200 $m^2/g$, especially at least 300 $m^2/g$ or at least 400 $m^2/g$, and may be above 1000 $m^2/g$, e.g. up to 2000 $m^2/g$. In general, the BET surface area is in the range from 100 to 2000 $m^2/g$, frequently 200 to 1500 $m^2/g$, preferably in the range from 300 to 1000 $m^2/g$ and especially in the range from 400 to 800 $m^2/g$.

The inventive film materials generally have a specific density in the range from 0.1 to 2.2 $g/cm^3$, preferably in the range from 0.3 to 1.9 $g/cm^3$, particularly in the range from 0.5 to 1.8 $g/cm^3$ and especially in the range from 0.8 to 1.3 $g/cm^3$.

The thickness of the film material is guided by the desired application. The thickness of the film material will generally not exceed 500 μm, particularly 300 μm and especially 100 μm (mean). In general, the film material will have a thickness of at least 5 μm, especially at least 10 μm. For the application as a separator material in electrochemical cells, in particular lithium ion cells or lithium sulfur cells, especially in lithium ion secondary cells or in lithium sulfur secondary cells, it has been found to be useful when the thickness of the film material is in the range from 5 to 200 μm, especially in the range from 10 to 100 μm or in the range from 10 to 50 μm.

The inventive porous film materials are, owing to their configuration, outstandingly suitable for electrochemical cells with high capacitance and high energy density. It is therefore advantageous when they, when used as separators, also have the safety measures specific to these applications, such as shutdown capacity and short-circuit capacity at high short-circuit temperature. Shutdown capacity can be achieved by providing the separator with low-melting substances, for example thermoplastics or waxes, which melt above the maximum operating temperature of the cell. In the event of a rise in the operating temperature as a result of faults such as overcharging, or external or internal short circuits, such low-melting substances can melt and block the pores of the separator. The ion flow through the separator is thus partly or completely blocked, and a further rise in temperature is prevented. At present, the temperature at which a shutdown in current flow is required for safety reasons is about 120° C. (shutdown temperature), and so materials which melt within this temperature range, i.e. in the range from 100 to 150° C., especially 110° C. to 130° C., are used for such a provision.

Such a provision can be achieved, for example, when the separator has a very thin layer of wax or polymer particles, known as shutdown particles, which melt at a desired shutdown temperature. Particularly preferred materials of which the shutdown particles may consist are, for example, natural or synthetic waxes, low-melting polymers, for example polyolefins, the material of the shutdown particles being selected such that the particles melt at the desired shutdown temperature and close the pores of the separator, such that further ion flow is prevented. The thickness of the shutdown particle layer is critical only in that too thick a layer would unnecessarily increase the resistance in the battery system. In order to achieve reliable shutdown, the shutdown particle layer should have a thickness (zw) which, based on the mean particle diameter of the shutdown particles (Dw), is in the range from 1 Dw to 10 Dw, preferably from 2 Dw to Dw. In order to achieve reliable shutdown, the shutdown layer should have a thickness of 1 to 20 µm, preferably of 5 to 10 µm. The porosity of the shutdown layer is preferably 20 to 80% and preferentially 40 to 60%.

A separator with such a provision has a primary safety feature. In contrast to the purely organic separator materials, this separator, however, cannot melt completely and hence meltdown is impossible. These safety features are very important owing to the very large amounts of energy for high-energy batteries and are therefore frequently required.

The production of the inventive film materials is possible by at least partial removal of the polymer phase B from a film composite material which comprises
 a) at least one carbonaceous (semi)metal oxide phase A of silicon, of aluminum, of titanium or of zirconium, which has hydrocarbon groups bonded covalently to the (semi)metal;
 b) one or more organic polymer phases B,
the carbonaceous (semi)metal oxide phase A and the polymer phase B forming essentially co-continuous phase domains, the mean distance between two adjacent domains of identical phases being not more than 50 nm, preferably not more than 10 nm, particularly not more than 5 nm and especially not more than 2 nm.

With regard to the carbonaceous (semi)metal oxide phase A, preferred (semi)metals, preferred hydrocarbon groups, preferred ratios of the hydrocarbon groups to (semi)metals, preferred phase arrangements and phase dimensions, and with regard to the organic polymer phase B and the thickness of the film composite material, the statements above apply in the same way.

In the film composite materials, the proportion of the polymer phase B is generally 5 to 95% by weight, especially 10 to 90% by weight or 20 to 80% by weight, and the proportion of the (semi)metal oxide phase A is 5 to 95% by weight, especially 10 to 90% by weight or 20 to 80% by weight, based on the total weight of the film composite material.

Such film composite materials are novel and likewise form part of the subject matter of the present invention.

The production of the film composite materials is possible by a process which comprises a so-called twin copolymerization of the monomers M1 and M2 illustrated in detail hereinafter under cationic polymerization conditions.

To produce the inventive porous film materials, in a second step, the polymer phase (B) is then removed partly, preferably to an extent of at least 50%, particularly to an extent of at least 70%, especially to an extent of at least 90% or completely.

The polymer phase (B) is removed in such a way that the majority of the hydrocarbon groups bonded to the (semi)metal, preferably at least 50%, especially at least 70%, remain in the film material.

A twin polymerization is understood to mean the polymerization of one or more monomers (so-called twin monomers) which have
 a first monomer unit which comprises a metal or semimetal which forms oxides, and
 a second organic monomer unit which is bonded via one or more chemical bonds, especially via one or more covalent bonds, to the first monomer unit.

The polymerization conditions of a twin polymerization are selected such that the first and the second monomer unit of the twin monomer polymerize synchronously in the course of polymerization of the twin monomer, the first monomer unit forming a first, oxidic polymeric material which comprises the metal or semimetal, and the second monomer unit simultaneously forming an organic polymer (polymer phase B) formed from the second monomer units. The term "synchronously" does not necessarily mean that the polymerizations of the first and second monomer units proceed at the same rate. Instead, "synchronously" is understood to mean that the polymerizations of the first and second monomer units are kinetically coupled and are triggered by the same polymerization conditions, generally cationic polymerization conditions.

Under the polymerization conditions, there is a partial or complete phase separation into a first carbonaceous oxidic phase (i.e. the carbonaceous (semi)metal oxide phase A), and a second phase formed by the organic polymer (second polymeric material, polymer phase B) formed from the second monomer units. In this way, a composite material composed of the carbonaceous (semi)metal oxide phase A and the polymer phase B is obtained. Owing to the synchronous polymerization, very small phase areas composed of the carbonaceous (semi)metal oxide phase A and of the polymer phase B form, the dimensions of which are in the region of a few nanometers, the phase domains of the carbonaceous (semi)metal oxide phase A and the polymer phase B having a co-continuous arrangement. The distances between adjacent phase boundaries, or the distances between the domains of adjacent identical phases, are exceptionally small and are on average not more than 50 nm, frequently not more than 10 nm, particularly not more than 5 nm and especially not more than 2 nm. There is no macroscopically visible separation into discontinuous domains of the particular phase. Surprisingly, the co-continuous arrangement of the phase domains, just like the small dimensions of the phase domains, are preserved when the polymer phase B is finally removed.

The hydrocarbon groups which are present in the carbonaceous (semi)metal oxide phase A and are bonded to the (semi)metal atoms result from the at least partial use in the polymerization of those twin monomers, as explained above, which bear at least one hydrocarbon group which is bonded to the (semi)metal atom of the twin monomer via a carbon atom.

Twin polymerization is known in principle and was described for the first time by S. Spange et al., Angew. Chem. Int. Ed., 46 (2007) 628-632 with reference to the cationic polymerization of tetrafurfuryloxysilane to polyfurfuryl alcohol and silicon dioxide, and with reference to the cationic polymerization of difurfuryloxydimethylsilane to polyfurfuryl alcohol and polydimethylsiloxane. Moreover, PCT/EP 2008/010169 (WO 2009/083083) describes a twin polymerization of optionally substituted 2,2'-spiro[4H-1,3,2-benzodioxasilin] (hereinafter, SPISI). To the disclosure on this subject in PCT/EP 2008/010169 herewith reference is made to the full extent. Twin polymerization for production of films has not been described to date. Twin copolymerization of two different monomers has likewise not been described to date.

The production of the film composite material which is used as the starting material for producing the inventive porous film materials comprises the copolymerization of at least one monomer M1 which is formed from
- a metal or semimetal atom M which is selected from silicon, aluminum, titanium and zirconium,
- at least one cationically polymerizable organic monomer unit which is bonded covalently to the metal or semimetal atom M via one or more oxygen atoms, and
- at least one hydrocarbon group bonded covalently to the metal or semimetal atom M via a carbon atom;

with at least one monomer M2 which is formed from
- a metal or semimetal atom M which is selected from silicon, aluminum, titanium or zirconium, and
- at least one cationically polymerizable organic monomer unit which is bonded covalently to the metal or semimetal atom M via one or more oxygen atoms;

under cationic polymerization conditions to form a film composite material which comprises
a) at least one carbonaceous (semi)metal oxide phase A; and
b) at least one organic polymer phase B.

The cationic polymerization conditions ensure, in the case of such monomers M1 and M2, a synchronous polymerization of the monomer units ($MO_2$ or $M_2O_3$ on the one hand, and cationically polymerizable organic unit on the other hand).

Examples of suitable monomers M1 are especially the monomers of the general formula I

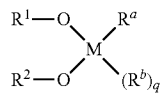
(I)

in which
M is silicon, aluminum, titanium or zirconium, and especially silicon;
$R^1$, $R^2$ may be the same or different and are each an Ar—C($R^c$,$R^d$) radical in which Ar is an aromatic or heteroaromatic ring which optionally has one or two substituents selected from halogen, CN, $C_1$-$C_6$-alkyl, $C_1$-$C_6$-alkoxy and phenyl, and $R^c$, $R^d$ are each independently hydrogen or methyl or together are an oxygen atom,
or the $R^1O$ and $R^2O$ radicals together are a radical of the formula A

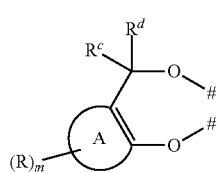
(A)

in which A is an aromatic or heteroaromatic ring fused onto the double bond, m is 0, 1 or 2, R may be the same or different and is selected from halogen, CN, $C_1$-$C_6$-alkyl, $C_1$-$C_6$-alkoxy and phenyl, and $R^c$, $R^d$ are each as defined above;
q according to the valency of M is 0 or especially 1;
$R^a$ is $C_1$-$C_{100}$-alkyl, $C_3$-$C_{10}$-cycloalkyl or aryl, especially $C_1$-$C_{100}$-alkyl or phenyl; and $R^b$ is $C_1$-$C_6$-alkyl or aryl, preferably $C_1$-$C_4$-alkyl or phenyl, especially methyl.

Examples of suitable monomers M2 are especially the monomers of the general formula II

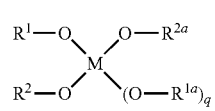
(II)

in which
M is silicon, aluminum, titanium or zirconium, and especially silicon;
$R^1$, $R^2$ may be the same or different and are each an Ar—C($R^c$,$R^d$) radical in which Ar is an aromatic or heteroaromatic ring which optionally has one or two substituents selected from halogen, CN, $C_1$-$C_6$-alkyl, $C_1$-$C_6$-alkoxy and phenyl, and $R^c$, $R^d$ are each independently hydrogen or methyl or together are an oxygen atom,
or the $R^1O$ and $R^2O$ radicals together are a radical of the formula A as defined above for formula I,
$R^{1a}$ and $R^{2a}$ each have one of the definitions specified for $R^1$ and $R^2$, where the $R^{1a}O$ and $R^{2a}O$ radicals together may preferably be a radical of the formula A as defined above for formula I when q=1,
q according to the valency of M is 0 or especially 1.

An aromatic radical is understood in relation to the formulae I and II to mean a carbocyclic aromatic hydrocarbon radical such as phenyl or naphthyl.

A heteroaromatic radical is understood in relation to the formulae I and II to mean a heterocyclic aromatic radical which generally has 5 or 6 ring members, where one of the ring members is a heteroatom selected from nitrogen, oxygen and sulfur, and one or two further ring members may optionally be a nitrogen atom, and the remaining ring members are carbon. Examples of heteroaromatic radicals are furyl, thienyl, pyrrolyl, pyrazolyl, imidazolyl, oxazolyl, isoxazolyl, pyridyl and thiazolyl.

A fused aromatic radical or ring is understood in relation to the formulae I and II to mean a carbocyclic, aromatic, divalent hydrocarbon radical such as o-phenylene (benzo) or 1,2-naphthylene (naphtho).

A fused heteroaromatic radical or ring is understood in relation to the formulae I and II to mean a heterocyclic aromatic radical as defined above, in which two adjacent carbon atoms form the double bond shown formula A or in the following formulae Ia and IIa.

In a first embodiment of the monomers of the formula I, the $R^1O$ and $R^2O$ groups together are a radical of the formula A as defined above, especially a radical of the formula Aa:

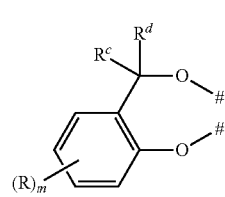
(Aa)

in which #, m, R, $R^c$ and $R^d$ are each as defined above.
In a first embodiment of the monomers of the formula II, the $R^1O$ and $R^2O$ groups, and the $R^{1a}O$ and $R^{2a}O$ groups, in each case together are a radical of the formula A, especially a radical of the formula Aa as defined above.

In the formulae A and Aa, the variable m is especially 0. When m is 1 or 2, R is especially a methyl or methoxy group. In the formulae A and Aa, $R^c$ and $R^d$ are especially each hydrogen.

Among the monomers M1, preference is given to those of the formula I in which q=1, and in which the $R^1O$ and $R^2O$ groups together are a radical of the formula A, especially a radical of the formula Aa in which $R^c$ and $R^d$ are each hydrogen. Such monomers can be described by the following formulae Ia and Iaa:

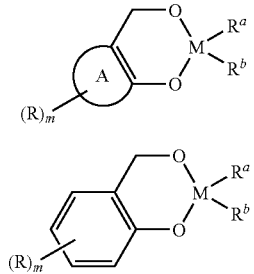

In formula Ia, the variables are each defined as follows:
M is Si, Ti or Zr, especially Si;
A is an aromatic ring fused to the double bond;
m is 0, 1 or 2, especially 0;
R is independently selected from halogen, CN, $C_1$-$C_6$-alkyl, $C_1$-$C_6$-alkoxy and phenyl, and is especially methyl or methoxy;
$R^a$ is $C_1$-$C_{100}$-alkyl, $C_3$-$C_{10}$-cycloalkyl or aryl, especially $C_1$-$C_{100}$-alkyl or phenyl; and
$R^b$ is $C_1$-$C_6$-alkyl, especially methyl.

In formula Iaa, the variables are each defined as follows:
M is Si, Ti or Zr, especially Si;
m is 0, 1 or 2, especially 0;
R is independently selected from halogen, CN, $C_1$-$C_6$-alkyl, $C_1$-$C_6$-alkoxy and phenyl, and is especially methyl or methoxy;
$R^a$ is $C_1$-$C_{100}$-alkyl, $C_3$-$C_{10}$-cycloalkyl or aryl, especially $C_1$-$C_{100}$-alkyl or phenyl; and
$R^b$ is $C_1$-$C_6$-alkyl, especially methyl.

Examples of monomers of the formula Ia or Iaa are 2,2-dimethyl-4H-1,3,2-benzodioxasilin (compound of the formula Iaa where M=Si, m=0, $R^a$=$R^b$=methyl), 2,2-diphenyl-4H-1,3,2-benzodioxasilin (compound of the formula Iaa where M=Si, m=0, $R^a$=$R^b$=phenyl), 2-methyl-2-phenyl-4H-1,3,2-benzodioxasilin (compound of the formula Iaa where M=Si, m=0, $R^a$=phenyl $R^b$=methyl), 2-methyl-2-cyclohexyl-4H-1,3,2-benzodioxasilin (compound of the formula Iaa where M=Si, m=0, $R^a$=cyclohexyl, $R^b$=methyl), 2-methyl-2-octadecyl-4H-1,3,2-benzodioxasilin (compound of the formula Iaa where M=Si, m=0, $R^a$=octadecyl, $R^b$=methyl) and 2-methyl-2-polyisobutenyl-4H-1,3,2-benzodioxasilin (compound of the formula Iaa where M=Si, m=0, $R^a$=polyisobutenyl, $R^b$=methyl). Such monomers are known, for example, from M. Wieber et al. Journal of Organometallic Chemistry, 1, 1963, 93, 94, or can be prepared by the techniques described there.

Among the monomers M2, preference is given to those of the formula II in which q=1, and in which the $R^1O$ and $R^2O$ groups, and the $R^{1a}O$ and $R^{2a}O$ groups, in each case together are a radical of the formula A, especially a radical of the formula Aa, in which $R^c$ and $R^d$ are each hydrogen. Such monomers can be described by the following formulae IIa or IIaa:

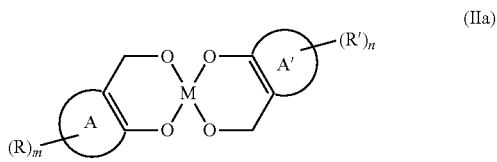

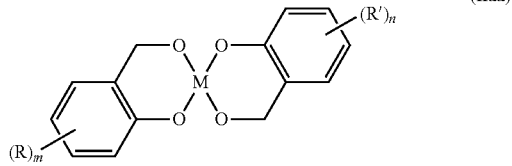

In formula IIa, the variables are each defined as follows:
M is Si, Ti or Zr, especially Si;
A, A' are each independently an aromatic ring fused to the double bond;
m, n are each independently 0, 1 or 2, especially 0;
R, R' are each independently selected from halogen, CN, $C_1$-$C_6$-alkyl, $C_1$-$C_6$-alkoxy and phenyl, and are especially methyl or methoxy.

In formula IIaa, the variables are each defined as follows:
M is Si, Ti or Zr, especially Si;
m, n are each independently 0, 1 or 2, especially 0;
R, R' are each independently selected from halogen, CN, $C_1$-$C_6$-alkyl, $C_1$-$C_6$-alkoxy and phenyl, and are especially methyl or methoxy.

One example of a monomer of the formula IIa or IIaa is 2,2'-spirobis-[4H-1,3,2-benzodioxasilin] (compound of the formula IIaa where M=Si, m=n=0). Such monomers are known from prior international patent application PCT/EP 2008/010169 or can be prepared by the methods described there.

In general, in the polymerization, the molar ratio of the monomers M1 and M2 relative to one another will be selected such that the desired amount of hydrocarbon groups in the (semi)metal oxide phase A is obtained. In general, the molar ratio of the monomers M1 and M2 relative to one another is in the range from 5:95 to 95:5, frequently in the range from 1:9 to 95:5 or 1:4 to 9:1, particularly in the range from 3:7 to 85:15 and especially in the range from 2:3 to 4:1.

The polymerization conditions in the process according to the invention are selected such that, in the polymerization of the monomers M1 and M2, the monomer units which form the phase A, i.e. the $MOR^aR^b$, $MOR^a$, $MO_2$ or $M_2O_3$ groups, and monomer units which form the polymer phase B, i.e. the cationically polymerizable organic unit, polymerize synchronously. The term "synchronously" does not necessarily mean that the polymerizations of the first and second monomer units proceed at the same rate. Instead, "synchronously" is understood to mean that the polymerizations of the first and second monomers units are kinetically coupled and are triggered by the same polymerization conditions.

In the case of the monomers M1 and M2, a synchronous polymerization is ensured when the copolymerization is performed under cationic polymerization conditions. The copolymerization of the monomers M1 and M2, especially the copolymerization of the monomers of the above-defined general formulae I, Ia, Iaa, with II, IIa or IIaa, is especially performed under protic catalysis or in the presence of aprotic Lewis acids. Preferred catalysts here are Brønsted acids, for example organic carboxylic acids, for example trifluoroacetic acid, trichloroacetic acid, formic acid, chloroacetic acid, dichloroacetic acid, hydroxyacetic acid (glycolic acid), lactic acid, cyanoacetic acid, 2-chloropropanoic acid, 2,3-bishydroxypropanoic acid, malic acid, tartaric acid, mandelic acid, benzoic acid or o-hydroxybenzoic acid, and organic sulfonic acids such as methanesulfonic acid, trifluoromethanesulfonic acid or toluenesulfonic acid. Likewise suitable are inorganic Brønsted acids such as HCl, $H_2SO_4$ or $HClO_4$. The Lewis acid used may, for example, be $BF_3$, $BCl_3$, $SnCl_4$, $TiCl_4$, or $AlCl_3$. It is also possible to use Lewis acids bound in complex form or dissolved in ionic liquids. The acid is typically used in an amount of 0.1 to 10% by weight, preferably 0.5 to 5% by weight, based on the monomer.

Preferred catalysts are organic carboxylic acids, especially organic carboxylic acids having a pKa (25° C.) in the range from 0 to 5, especially 1 to 4, for example trifluoroacetic acid, trichloroacetic acid, formic acid, chloroacetic acid, dichloroacetic acid, hydroxyacetic acid (glycolic acid), lactic acid, cyanoacetic acid, 2-chloropropanoic acid, 2,3-bishydroxypropanoic acid, malic acid, lactic acid or o-hydroxybenzoic acid.

The polymerization can be performed in substance or preferably at least partly in an inert solvent or diluent. Suitable solvents or diluents are organic solvents, for example halogenated hydrocarbons such as dichloromethane, trichloromethane, dichloroethene, chlorobutane or chlorobenzene, aromatic hydrocarbons such as toluene, xylenes, cumene or tert-butylbenzene, aliphatic and cycloaliphatic hydrocarbons such as cyclohexane or hexane, cyclic or alicyclic ethers such as tetrahydrofuran, dioxane, diethyl ether, methyl tert-butyl ether, ethyl-tert-butyl ether, diisopropyl ether and mixtures of the aforementioned organic solvents. Preference is given to those organic solvents in which the monomers M1 and M2 are sufficiently soluble under polymerization conditions (solubility at 25° C. at least 10% by weight). These include especially aromatic hydrocarbons, cyclic and alicyclic ethers, and mixtures of these solvents.

The copolymerization of the monomers M1 and M2 is preferably performed in the substantial absence of water, i.e. the concentration of water at the start of the polymerization is less than 0.1% by weight. Accordingly, preferred monomers monomers M1 and M2 or monomers of the formulae I and II are those monomers which do not eliminate water under polymerization conditions. These include especially the monomers of the formulae Ia, Iaa, IIa and IIaa.

The polymerization temperature is typically in the range from 0 to 150° C., especially in the range from 20 to 120° C.

The inventive copolymerization will generally be performed in such a way that the composite material which forms in the course of polymerization, the carbonaceous (semi)metal oxide phase A of which is generally insoluble in the common solvents, is obtained directly as the film material or is obtained in a form which enables processing to give a film material, for example in the form of a suspension or of an emulsion of the film material in an inert organic diluent. Processes for producing thin polymer films by polymerization are known to those skilled in the art and can be applied in an analogous manner to the production of the film composites by copolymerization of the monomers M1 and M2.

In a first embodiment, a thin layer of the monomers M1 and M2, which are optionally present in dissolved form, is polymerized to form a film material. For example, a melt of the monomers M1 and M2 or a thin layer of a solution of the monomers M1 and M2 can be polymerized to completion in a suitable solvent in the presence of the catalyst, and any solvent present can be removed after the polymerization. This forms a thin layer of the composite material. Preferably, the polymerization can be performed on a support with a smooth surface. The support is generally selected such that the polymer can be detached therefrom. For example, the support selected may be a smooth hydrophobic surface, for example a smooth surface which has been coated with Teflon or with a polyisobutene derivative or a siliconized smooth surface, for example a glass or metal surface which has been coated with Teflon or with a polyisobutene derivative or a siliconized smooth glass or metal surface.

It has been found to be useful when the copolymerization is performed at least partly in an inert solvent or diluent. The procedure here may be to partly polymerize a melt of the monomers M1 and M2 in the presence of a catalyst at the start of the polymerization, to add solvents or diluents to reduce the viscosity in the course of the polymerization, and to polymerize the mixture thus obtained to completion in a thin layer on a support. The procedure may also be to prepare a solution of the monomers in a suitable solvent, to start the polymerization by adding the catalyst and optionally heating, and then to polymerize the partly polymerized reaction mixture to completion in a thin layer, for example on a support. Any solvent can be removed during the polymerization, for example by heating and/or by applying reduced pressure.

In a second embodiment, a solution of the monomers M1 and M2 in a suitable organic solvent is copolymerized in the presence of the catalyst, in which case, owing to the sparing solubility of the composites in organic solvents, the composite material is obtained in the form of a suspension of a particulate solid. This suspension can be processed further in a manner known per se, optionally while heating, to give a film of the composite material.

Subsequently, the polymer phase B will be removed from the composite material thus obtained at least partly, preferably to an extent of at least 50%, especially to an extent of at least 70% or to an extent of at least 80%, based in each case on the polymer phase B present in the composite material, or will be removed completely. The removal of the polymer phase B can be performed by oxidative degradation or by leaching it out with an organic solvent.

In the case of an oxidative degradation, the film composite material obtained in the polymerization will generally be subjected to a thermal treatment in an oxygen-comprising atmosphere, for example in air or oxygen-enriched air.

The thermal treatment is generally performed at a temperature in the range from 300 to 700° C., especially in the range from 400 to 600° C. At higher temperatures, increased oxidative degradation of the hydrocarbon groups bonded to the (semi)metal atoms may take place, but can be tolerated within certain limits. The oxygen content in the oxygen-comprising atmosphere is generally at least 10% by volume and is especially in the range from 15 to 100% by volume.

For the leaching-out, the film composite material obtained in the polymerization of monomers M1 and M2 will generally be treated with an organic solvent in which the polymer phase B is soluble. This leaches the polymer phase B at least partly out of the carbonaceous (semi)metal oxide phase A, as a result of which the inventive porous film material remains.

Suitable solvents for leaching out the polymer phase are polar amides such as N-methylpyrrolidone, N,N-dimethylformamide, N,N-dimethylacetamide, ketones such as acetone or cyclohexanone, acetonitrile, chlorohydrocarbons such as dichloromethane, carbonates such as ethylene carbonate (2-oxa-1,3-dioxolane), propylene carbonate (2-oxa-1,3-dioxane), diethyl carbonate, ethers such as diethyl ether, 1,2-dimethoxyethane, esters such as ethyl formate, ethyl acetate, propyl formate, propyl acetate and the like. The leaching-out is effected generally at elevated temperature and/or by treatment with the organic solvent over a prolonged period. The conditions required for leaching-out can be determined by the person skilled in the art by routine experiments.

The porous film materials thus obtained are particularly suitable as a separator material in electrochemical cells and hence for producing separators in these cells.

In the context of this invention, an electrochemical cell or battery is understood to mean batteries, capacitors and accumulators (secondary batteries) of any kind, especially alkali metal cells or batteries, for example lithium, lithium ion, lithium sulfur and alkaline earth metal batteries and accumulators, also in the form of high-energy or high-performance systems, and electrolytic capacitors and double-layer capacitors which are known by the names of Supercaps, Goldcaps, BoostCaps or Ultracaps.

The inventive porous film materials are especially suitable for electrochemical cells based on the transfer of alkali metal ions, particularly for lithium metal, lithium sulfur and lithium ion cells or batteries and especially for lithium ion secondary cells or secondary batteries. The inventive porous film materials are particularly suitable for electrochemical cells from the group of the lithium-sulfur cells.

The present invention therefore provides especially lithium ion cells, especially lithium ion secondary cells, which have at least one separator layer formed from the inventive porous film material. Such cells generally have at least one lithium ion cells suitable anode, a cathode suitable for lithium ion cells, an electrolyte and at least one separator layer comprising an inventive film material and arranged between the anode and the cathode.

The present invention therefore also provides especially lithium sulfur cells, especially lithium sulfur secondary cells, which have at least one separator layer formed from the inventive porous film material. Such cells generally have at least one lithium sulfur cells suitable anode, a cathode suitable for lithium sulfur cells, an electrolyte and at least one separator layer comprising an inventive film material and arranged between the anode and the cathode.

With regard to suitable anode and cathode materials, suitable electrolytes and possible arrangements, reference is made to the relevant prior art, for example to the prior art cited at the outset and to corresponding monographs and reference works: for example, Wakihara et al. (editors) in *Lithiumion Batteries*, 1st edition, Wiley VCH, Weinheim, 1998; David Linden: *Handbook of Batteries* (McGraw-Hill Handbooks). 3rd edition, McGraw-Hill Professional, New York 2008; J. O. Besenhard: *Handbook of Battery Materials*. Wiley-VCH, 1998.

Useful cathodes are especially those cathodes in which the cathode material comprises, as an electroactive constituent, a lithium-transition metal oxide, e.g. lithium-cobalt oxide, lithium-nickel oxide, lithium-cobalt-nickel-oxide, lithium-manganese oxide (spinel), lithium-nickel-cobalt-aluminum oxide, lithium-nickel-cobalt-manganese oxide or lithium-vanadium oxide, a lithium sulfide or lithium polysulfide such as $Li_2S$, $Li_2S_8$, $Li_2S_6$, $Li_2S_4$, or $Li_2S_3$ or a lithium-transition metal phosphate such as lithium-iron phosphate. Also suitable are cathode materials which comprise iodine, oxygen, sulfur and the like as electroactive constituents.

Useful anodes are especially those anode materials in which the anode material comprises, as an electroactive constituent, graphite, metallic lithium, a lithium graphite compound, a lithium alloy, e.g. lithium-silicon alloys, nanocrystalline silicon or lithium-metal oxides such as lithium titanate (e.g. $Li_4Ti_5O_{12}$).

In addition to the electroactive constituents, the anodes and cathodes may also comprise further constituents, for example
electrically conductive or electroactive constituents such as carbon black, graphite, carbon fibers, carbon nanofibers, carbon nanotubes or electrically conductive polymers;
binders such as polyethylene oxide (PEO), cellulose, carboxymethylcellulose (CMC), polyethylene, polypropylene, polytetrafluoroethylene, polyacrylonitrile-methyl methacrylate, polytetrafluoroethylene, styrene-butadiene-copolymers, tetrafluoroethylene-hexafluoroethylene copolymers, polyvinylidene difluoride (PVdF), polyvinylidene difluoride-hexafluoropropylene copolymers (PVdF-HFP), tetrafluoroethylene-hexafluoropropylene copolymers, tetrafluoroethylene, perfluoroalkyl vinyl ether copolymers, vinylidene fluoride-hexafluoropropylene copolymers, ethylene-tetrafluoroethylene copolymers, vinylidene fluoride-chlorotrifluoroethylene copolymers, ethylene-chlorofluoroethylene copolymers, ethylene-acrylic acid copolymers (with and without inclusion of sodium ions), ethylene-methacrylic acid copolymers (with and without inclusion of sodium ions), ethylene-methacrylic ester copolymers (with and without inclusion of sodium ions), polyimides and polyisobutene.

The two electrodes, i.e. the anode and the cathode, are connected to one another in a manner known per se using an inventive separator and a liquid or else solid electrolyte. To this end, it is possible, for example, to apply an inventive film material, for example by lamination, to one of the two electrodes which is provided with an output conductor (anode or cathode), impregnate it with the electrolyte, and then apply the oppositely charged electrode provided with an output conductor, optionally wind the sandwich thus obtained and introduce it into a battery housing. The procedure may also be to layer the output conductor, cathode, separator, anode and output conductor constituents in the form of sheets or films to form a sandwich, optionally wind the sandwich, envelope it into a battery housing, and then impregnate the arrangement with the electrolyte.

Useful liquid electrolytes include especially nonaqueous solutions (water content generally <20 ppm) of lithium salts and molten lithium salts, for example solutions of lithium hexafluorophosphate, lithium perchlorate, lithium hexafluoroarsenate, lithium trifluoromethylsulfonate, lithium bis(trifluoromethylsulfonyl)imide or lithium tetrafluoroborate, especially lithium hexafluorophosphate or lithium tetrafluoroborate, in suitable aprotic solvents, for example ethylene carbonate, propylene carbonate and mixtures thereof with one or more of the following solvents: dimethyl carbonate, diethyl carbonate, dimethoxyethane, methyl propionate, ethyl propionate, butyrolactone, acetonitrile, ethyl acetate, methyl acetate, toluene and xylene, especially in a mixture of ethylene carbonate and diethyl carbonate.

Between the electrodes is arranged an inventive separator layer, which is generally impregnated with the liquid electrolyte, especially a liquid organic electrolyte.

The examples which follow serve to illustrate the invention and should not be interpreted in a restrictive manner.

Starting Materials

Oligoisobutenyldichloromethylsilane: alkyldichloromethylsilane, in which the alkyl radical is an oligoisobutenyl radical with a number-average molecular weight of about 1000 daltons (approx. 17.8 isobutene repeat units).

A. Preparation of the Monomers

PREPARATION EXAMPLE 1

2,2'-Spirobis[4H-1,3,2-benzodioxasilin] (BIS)

135.77 g of salicyl alcohol (1.0937 mol) were dissolved in anhydrous toluene at 85° C. Subsequently, 83.24 g (0.5469 mol) of tetramethoxysilane (TMOS) were slowly added dropwise, and, after addition of one third of the TMOS, 0.3 ml of tetra-n-butylammonium fluoride (1M in THF) was injected all at once. The mixture was stirred at 85° C. for 1 h, and then the methanol/toluene azeotrope was distilled off (63.7° C.). The residual toluene was removed on a rotary evaporator. The product was dissolved out of the reaction mixture thus obtained with n-hexane at ≈70° C. After cooling to 20° C., the clear solution was decanted off. After removing the n-hexane, the title compound remained as a white solid. The product can be purified to free it of further impurities by dissolving in toluene and reprecipitating with n-hexane.

$^1$H NMR 400 MHz, CDCl$_3$, 25° C., TMS) δ [ppm]=5.21 (m, 4H, CH$_2$), 6.97-7.05 (m, 6H), 7.21-7.27 (M, 2H).
$^{13}$C NMR (100 MHz, CDCl$_3$, 25° C., TMS): δ [ppm]=66.3 (CH$_2$), 119.3, 122.3, 125.2, 125.7, 129.1, 152.4.
$^{29}$Si-CP-MAS (79.5 MHz): δ [ppm]=−78.4

PREPARATION EXAMPLE 2

2-Methyl-2-octadecyl-[4H-1,3,2-benzodioxasilin]

In a 1 l four-neck flask with stirrer, reflux condenser and dropping funnel, 31.7 g of salicyl alcohol (0.25 mol) and 66.7 g (0.52 mol) of dried N-ethyldiisopropylamine were suspended under argon in 100 ml of anhydrous toluene at 22° C. 110 g of Octadecylmethyldichlorosilane (95%; 0.25 mol) was melted and dissolved in 100 ml of dry toluene. This solution was added dropwise at 23 to 27° C. within 55 minutes, in the course of which an exothermic reaction was observed. Cooling with an ice bath held the reaction temperature at a maximum of 27° C. After the addition had ended, the temperature was raised to 40° C., and exothermicity (without heating to 45° C.) was again observed. The reaction vessel was then cooled to 40° C. with cold water, and it was stirred at this temperature for one hour and then cooled to RT. The suspension was left to stand at RT overnight. The precipitate (hydrochloride) was filtered off with suction through a P40 glass frit under N$_2$, and the filtrate was concentrated by rotary evaporation at 120° C./5 mbar. Yield 80.9 g (77% of theory).

PREPARATION EXAMPLE 3

2-Methyl-2-oligo(isobutenyl)-[4H-1,3,2-benzodioxasilin]

In a 2 l four-neck flask with stirrer, reflux condenser and dropping funnel, 12.5 g of salicyl alcohol (0.1 mol) and 26 g (0.2 mol) dried N-ethyldiisopropylamine were suspended under argon in 150 ml of anhydrous toluene at 22° C. A mixture of 110 g (0.1 mol) of oligoisobutenyldichloromethylsilane and 100 ml of toluene was added dropwise thereto by means of the dropping funnel at 22° C. within 70 min. In the course of this, the internal temperature rose to a maximum of 27.4° C. As early as after ⅔ of the addition, no further exothermicity was observed and the rest was added rapidly. The mixture was stirred at RT for 90 min and then heated to 80° C. (internal temperature). While stirring, the mixture was allowed to cool to 22° C., and the precipitated hydrochloride was filtered off by means of a suction filter. The toluene solution was then concentrated by rotary evaporation at 120° C. and 5 mbar to obtain 78 g (67% of theory) of the title compound in the form of a solid material.

B. Production of the Film Composite Material

EXAMPLE 1

1.5 mmol of monomer A (2,2'-spirobi-[4H-1,3,2-benzodioxasilin]) and 3.5 mmol of monomer B (2,2-dimethyl-4H-1,3,2-benzodioxasilin) were introduced into a flask under inert gas and the mixture was heated until everything had melted. Then a mixture of 65.8 mg of trifluoroacetic acid and 0.5 ml of tetrahydrofuran was added and the mixture was heated to 85° C. for 30 min. Subsequently, 2 ml of tetrahydrofuran were added until a homogeneous solution was present. The flask contents were then introduced into a Teflon film dish (diameter approx. 6 cm) prepared in a desiccator and, with a gentle nitrogen stream into the desiccator, polymerized to completion in a drying cabinet first at 400 mbar and 45° C. for 2 h and then at 90° C. for 4 h. A pale yellowish, soft film of thickness 470 μm was obtained.

EXAMPLE 2

The production was as in example 1, with the following difference. Instead of the mixture of trifluoroacetic acid and tetrahydrofuran, 52 mg of lactic acid were added and the mixture was polymerized at 85° C. for 4 minutes, before 2 ml of tetrahydrofuran were added. A pale yellowish, soft film of thickness 450 μm was obtained.

EXAMPLE 3

1.5 mmol of 2,2'-spirobi-[4H-1,3,2-benzodioxasilin] (45% in toluene) and 3.5 mmol of monomer B (2,2-dimethyl-4H-1,3,2-benzodioxasilin) were introduced into a reaction vessel under inert gas. Subsequently, 65.8 mg of trifluoroacetic acid in toluene (0.5 ml) were added, and the mixture was stirred and heated to 85° C. Partial polymerization was effected at 85° C. for 5 minutes. Subsequently, the flask contents were transferred into a silanized Petri dish (diameter approx. 5 cm) under inert gas, and the film formed was polymerized at 85° C. for 3.5 h. A yellowish film of thickness 150 μm was obtained.

It was possible to remove the toluene solvent from this film by an aftertreatment at 150° C. and 900 mbar for 30 minutes.

EXAMPLE 4

2.2 mmol of 2,2'-spirobi-[4H-1,3,2-benzodioxasilin] (45% in toluene) and 3.3 mmol of monomer B (2,2-dimethyl-4H-1,3,2-benzodioxasilin) were introduced into a reaction vessel under inert gas. Subsequently, 65.8 mg of trifluoroacetic acid in toluene (0.5 ml) were added, and the mixture was stirred and heated to 85° C. Partial polymerization was effected at 85° C. for 5 minutes. Subsequently, the flask contents were transferred into a silanized Petri dish (diameter approx. 5 cm) under inert gas, and the film formed was polymerized at 85° C. for 3.5 h. A yellowish film of thickness 120 μm was obtained.

It was possible to remove the toluene solvent from this film by an aftertreatment at 150° C. and 900 mbar for 30 minutes.

C. Production of the Porous Film Material

EXAMPLE 4

Noninventive

A film prepared according to example 1 (900 mg) was heated to 800° C. under oxygen for 8 hours. There remained 125 mg of a white composite. Elemental analysis showed pure $SiO_2$ (C: 0.5 g/100 g, H: 0.8 g/100 g, Si: 43 g/100 g, O: 55.7 g/100 g).

EXAMPLE 5

A film from example 1 (900 mg) was heated to 500° C. under oxygen for 8 hours.

EXAMPLE 6

A film prepared according to example 1 (200 mg) was stored at 22° C. in acetone (2 ml) for 8 hours. Subsequently, the film was withdrawn, rinsed with acetone and dried at 50° C. and 900 mbar for 2 h.

The invention claimed is:

1. A porous film material comprising:
   a) at least one carbonaceous (semi)metal oxide phase A of silicon, of aluminum, of titanium or of zirconium, which has hydrocarbon groups bonded covalently to the (semi)metal of said (semi)metal oxide phase A;
   b) optionally one or more organic polymer phases B,
   said carbonaceous (semi)metal oxide phase A forming essentially continuous phase domains in which the pore phase present in the film material and the optionally present organic polymer phase(s) B are intercalated, the mean distance between two phase boundaries of adjacent domains of identical phases being not more than 50 nm.

2. The film material according to claim 1, wherein 10 to 90 mol % of the (semi)metal atoms present in the (semi)metal oxide phase bear at least one hydrocarbon group.

3. The film material according to claim 1, in which the carbonaceous (semi)metal oxide phase A makes up at least 80% by weight of the film material.

4. The film material according to claim 1, in which at least 90 mol %, based on the total amount of the (semi)metal atoms present in the carbonaceous (semi)metal oxide phase A, are silicon atoms.

5. The film material according to claim 1, in which the pores make up at least 30% by volume, based on the total volume of the film material.

6. The film material according to claim 1, in which at least 50% by volume of the pores are nanopores which have a pore diameter in the range from 0.1 to 50 nm.

7. The film material according to claim 1, which has a specific density in the range from 0.1 to 2.2 g/cm³.

8. The film material according to claim 1, which has a specific BET surface area, determined by nitrogen adsorption at −196° C. to DIN 66131, in the range from 100 to 2000 m²/g.

9. The film material according to claim 1, which has a mean thickness in the range from 5 to 500 μm.

10. The film material according to claim 1, in which the hydrocarbon groups bonded to the (semi)metal are selected from alkyl groups, cycloalkyl groups and phenyl groups.

11. The film material according to claim 1, in which the optionally present organic polymer phase(s) is/are an aryl-formaldehyde resin.

12. A process for producing a film material according to claim 1, comprising i) the copolymerization
   of at least one monomer M1 which is formed from
      a metal or semimetal atom M which is selected from silicon, aluminum, titanium and zirconium,
      at least one cationically polymerizable organic monomer unit which is bonded covalently to the metal or semimetal atom M via one or more oxygen atoms, and
      at least one hydrocarbon group bonded covalently to the metal or semimetal atom M via a carbon atom;
   with at least one monomer M2 which is formed from
      a metal or semimetal atom M which is selected from silicon, aluminum, titanium or zirconium, and
      at least one cationically polymerizable organic monomer unit which is bonded covalently to the metal or semimetal atom M via one or more oxygen atoms;
   under cationic polymerization conditions to form a film composite material which comprises
      a) at least one carbonaceous (semi)metal oxide phase A; and
      b) at least one organic polymer phase B; and
ii) removing at least a portion of the organic polymer phase(s) B.

13. The process according to claim 12, wherein the monomers M1 are selected from monomers of the general formula I

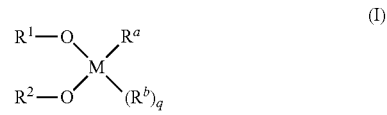

in which

M is silicon, aluminum, titanium or zirconium;

$R^1$, $R^2$ may be the same or different and are each an Ar—C($R^c$,$R^d$) radical in which Ar is an aromatic or heteroaromatic ring which optionally has one or two substituents selected from halogen, CN, $C_1$-$C_6$-alkyl, $C_1$-$C_6$-alkoxy and phenyl, and $R^c$, $R^d$ are each independently hydrogen or methyl or together are an oxygen atom, or the $R^1O$ and $R^2O$ radicals together are a radical of the formula A

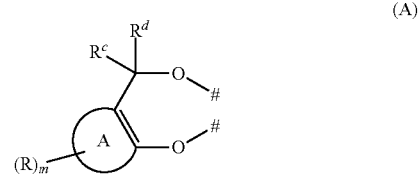

in which A is an aromatic or heteroaromatic ring fused onto the double bond, m is 0, 1 or 2, R may be the same or different and is selected from halogen, CN, $C_1$-$C_6$-alkyl, $C_1$-$C_6$-alkoxy and phenyl, and $R^c$, $R^d$ are each as defined above;

q according to the valency of M is 0 or 1;

$R^a$ is $C_1$-$C_{100}$-alkyl, $C_3$-$C_{10}$-cycloalkyl or aryl; and $R^b$ is $C_1$-$C_6$-alkyl or aryl;

and the monomers M2 are selected from monomers of the general formula II

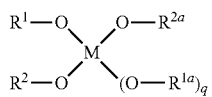

(II)

in which q, M, $R^1$ and $R^2$ are each as defined for formula I, and $R^{1a}$ and $R^{2a}$ each have one of the definitions specified for $R^1$ and $R^2$.

14. The process according to claim 12, wherein the monomers M1 are selected from monomers of the general formula Ia

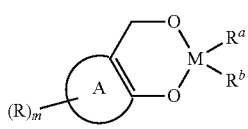

(Ia)

and the monomers M2 are selected from monomers of the general formula IIa

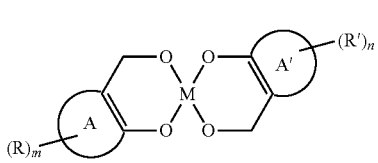

(IIa)

in which

M is titanium, zirconium or silicon;

A and A' are each an aromatic ring fused to the double bond;

m and n are each independently 0, 1 or 2;

R and R' are the same or different and are each independently selected from halogen, CN, $C_1$-$C_6$-alkyl, $C_1$-$C_6$-alkoxy and phenyl;

$R^a$ is $C_1$-$C_{100}$-alkyl, $C_3$-$C_{10}$-cycloalkyl or aryl; and $R^b$ is $C_1$-$C_6$-alkyl or phenyl.

15. The process according to claim 12, wherein the molar ratio of the monomers M1 and M2 to one another is in the range from 5:95 to 95:5.

16. The process according to claim 12, wherein the copolymerization is performed at least partly in an inert solvent or diluent.

17. The process according to claim 16, wherein the copolymerization is commenced at the start of the polymerization in a melt of the monomers M1 and M2, and is then continued in an inert solvent or diluent.

18. The process according to claim 12, wherein a carboxylic acid is used to catalyze the cationic polymerization.

19. The process according to claim 12, wherein the organic polymer phase(s) B is/are at least partly removed by subjecting the film material obtained in the polymerization to a thermal treatment in an oxygen-comprising atmosphere.

20. The process according to claim 19, wherein the thermal treatment is performed at a temperature in the range from 400 to 600° C.

21. The process according to claim 12, wherein the organic polymer phase(s) B is/are at least partly removed by treating the film material obtained in the polymerization with an organic solvent in which the polymer phase is soluble.

22. An electrochemical cell comprising at least one separator layer arranged between the electrodes, said separator layer being formed by a film material according to claim 1.

23. An electrochemical cell as claimed in claim 22, which is selected from lithium ion cells and lithium sulfur cells.

24. A film composite material comprising:
a) at least one carbonaceous (semi)metal oxide phase A of silicon, of aluminum, of titanium or of zirconium, which has hydrocarbon groups bonded covalently to the (semi)metal of said (semi)metal oxide phase A; and
b) one or more organic polymer phases B, the carbonaceous (semi)metal oxide phase A and the polymer phase B forming essentially co-continuous phase domains, the mean distance between two adjacent domains of identical phases being not more than 50 nm.

25. A process for producing a film composite material according to claim 24 which comprises copolymerizing
of at least one monomer M1 which is formed from
a metal or semimetal atom M which is selected from silicon, aluminum, titanium and zirconium,
at least one cationically polymerizable organic monomer unit which is bonded covalently to the metal or semimetal atom M via one or more oxygen atoms, and
at least one hydrocarbon group bonded covalently to the metal or semimetal atom M via a carbon atom;
with at least one monomer M2 which is formed from
a metal or semimetal atom M which is selected from silicon, aluminum, titanium or zirconium, and
at least one cationically polymerizable organic monomer unit which is bonded covalently to the metal or semimetal atom M via one or more oxygen atoms;
under cationic polymerization conditions to form a film composite material which comprises
a) at least one carbonaceous (semi)metal oxide phase A; and
b) at least one organic polymer phase B.

* * * * *